(No Model.)
G. HAYS.
BALL BEARING FOR LATHE SPINDLES.
No. 496,828. Patented May 2, 1893.
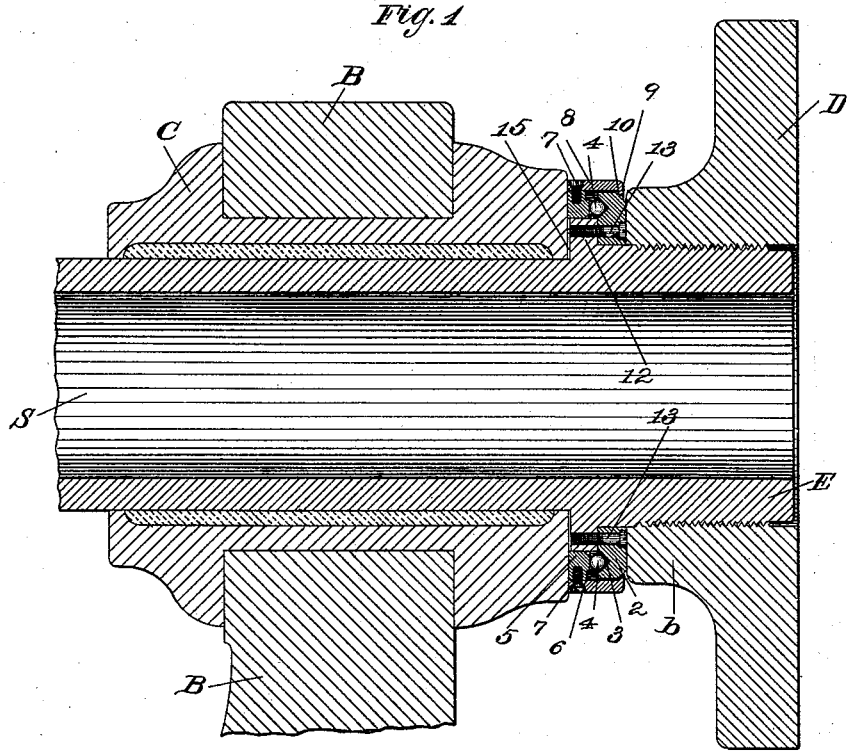
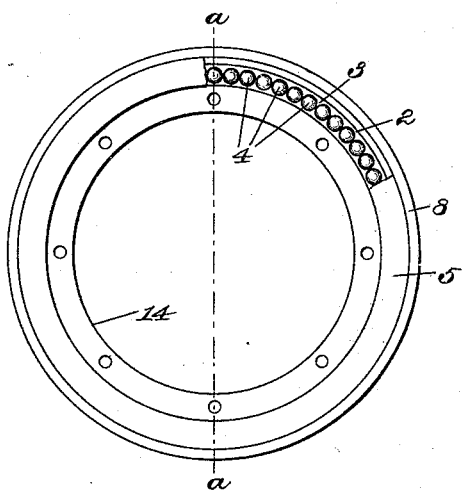
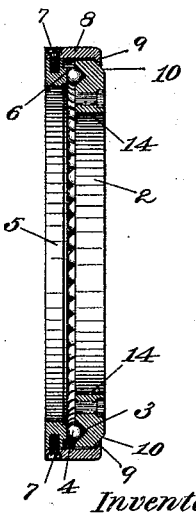
Witnesses:
H. Maltner.
Henry L. Reckard.
Inventor:
George Hays.
By his Attorney,
F. H. Richards.

UNITED STATES PATENT OFFICE.

GEORGE HAYS, OF HARTFORD, CONNECTICUT, ASSIGNOR TO THE PRATT & WHITNEY COMPANY, OF SAME PLACE.

BALL-BEARING FOR LATHE-SPINDLES.

SPECIFICATION forming part of Letters Patent No. 496,828, dated May 2, 1893.

Application filed June 13, 1891. Serial No. 396,108. (No model.)

*To all whom it may concern:*

Be it known that I, GEORGE HAYS, a citizen of the United States, residing at Hartford, in the county of Hartford and State of Connecticut, have invented certain new and useful Improvements in Ball-Bearings for Lathe-Spindles, of which the following is a specification.

This invention relates to ball-bearings for the spindles of lathes and like machines, the object being to furnish such a bearing adapted to take the "end-thrust" and thereby materially reduce the friction and wear in the journals, and also adapted to be removed and replaced without releasing the balls.

In the drawings accompanying and forming a part of this specification, Figure 1 is a vertical section of a portion of a lathe-head furnished with my improved ball-bearing. Fig. 2 is a side view of the bearing as seen from the left-hand in Fig. 1 the bearing being removed from the lathe-spindle. Fig. 3 is a sectional view of the bearing in line $a\,a$, Fig. 2.

Similar characters designate like parts in all the figures.

The reference character B designates a portion of an ordinary lathe head provided with the customary "box" or bearing, designated by C, in which the spindle S is fitted in the usual manner. The forward end E of said spindle is fitted to receive the face-plate D, screwed thereon.

My improved removable bearing consists of two rings or tracks, a series of balls between said tracks, and means holding the tracks in place to prevent releasing the balls. As shown in the drawings, the bearing consists of the ring 2, having formed in one of its faces the V-shaped or double-track groove 3, to receive the balls 4; the ring 5, having on the inner side thereof the single track 6, on which the balls run; the series of balls 4, and the retaining-ring 8, which is removably fixed to the periphery of said ring 5 by means of suitable screws, as 7, or otherwise. The ring or rim 8 has formed thereon an inwardly-projecting flange, 9, which reaches over (and normally stands near to) the beveled edge 10 of the track-ring 2, thus securely holding the several parts together and preventing the balls from falling out of place when removing the bearing from or placing it on the spindle. The beveled construction shown permits the retaining-ring to be of a lesser width than the thickness (longitudinally of the spindle) of the ball-bearing, so that the track-ring 2 may project slightly, as shown, to receive the abutting hub $b$ of the face-plate, or of a chuck. For locating the removable bearing thereon, the spindle S has formed thereon a flange or collar, 12, to which the ring 2 is secured by means of the screws 13; the inner surface, 14, of the said ring being fitted closely to the spindle, forward of said collar. The face-plate D is screwed onto the spindle S until the hub $b$ of said plate brings up against the forward face of the ring 2, thereby relieving said screws 13 (which are necessarily of relatively small size) of the thrust of the spindle. The breadths of the rings 2 and 5, and the thickness of the balls, are in practice so proportioned as to cause the collar 5 to protrude over the collar 12, so as to leave a small space, as 15, between the said collar and the forward end of the journal bearing C, so that the end-thrust will be wholly taken by the ball-bearing. To remove the bearing, it is only necessary to first remove the face-plate D, and then take out the screws 13, when the bearing may be taken off from the spindle in its assembled form shown in Figs. 2 and 3. By this means, the parts may be readily cleaned without the annoyance heretofore encountered of releasing the balls. When it is desired to clean the ball-bearing, it is first removed from the spindle and then laid down on a bench with the ring 5 uppermost; the screws 7 are then removed and the ring 5 taken out. All the parts of the bearing may then be cleaned as desired, and re-assembled as before.

Having thus described my invention, I claim—

1. The combination with the spindle and the collar thereon, and with the spindle-bearing, of the removable roller bearing comprising two track-rings and having one of its track-rings forward of said collar, and the face-plate screwed upon the spindle forward of and against said track-ring, substantially as described.

2. The combination with the spindle having the collar 12, of the track-ring 2 set against one side of said collar, the screws 13 removably holding the track-ring in place against the collar, the track-ring 5 outside of said spindle-collar and forward of the track-ring 2, the balls between said track-rings, and a ring substantially as described retaining the track-rings together when these are removed from the spindle, substantially as shown and set forth.

GEORGE HAYS.

Witnesses:
HENRY L. RECKARD,
E. G. FOWLER.